United States Patent [19]
Kyriakos

[11] 4,427,981
[45] Jan. 24, 1984

[54] TRACKING FILTER FOR RADIO ALTIMETER

[75] Inventor: Constantinos S. Kyriakos, Deerfield Beach, Fla.

[73] Assignee: The Bendix Corporation, Southfield, Mich.

[21] Appl. No.: 306,038

[22] Filed: Sep. 28, 1981

[51] Int. Cl.³ .............................................. G01S 9/04
[52] U.S. Cl. .................................. 343/12 A; 343/7 A
[58] Field of Search ....................... 343/14, 12 A, 7 A

[56] References Cited

U.S. PATENT DOCUMENTS

| | | | |
|---|---|---|---|
| 3,065,465 | 11/1962 | Wimberly | 343/14 |
| 3,334,344 | 8/1967 | Colby | 343/12 A |
| 3,344,423 | 9/1967 | Thue | 343/14 |
| 3,761,946 | 9/1973 | Johannesson et al. | 343/12 A |
| 3,789,398 | 1/1974 | Erst | 343/14 |
| 4,107,681 | 8/1978 | Robertson et al. | 343/14 |
| 4,122,529 | 10/1978 | Hoech | 343/12 A |

OTHER PUBLICATIONS

Reference Data for Radio Engineers, Howard W. Sam & Co. Inc., ITT, p. 16-4, (1982).
Post-Mixing Phase-Modulated FM-CW Radar Altimeter; Katano; IECE, Japan, vol. E61, No. 7, (Jul. 1978).

Primary Examiner—S. C. Buczinski
Assistant Examiner—M. R. Gordon
Attorney, Agent, or Firm—Bruce L. Lamb; W. G. Christoforo

[57] ABSTRACT

A filter for tracking the ground signal return in an FM/CW radio altimeter. The filter has a variable band pass frequency response which is adjusted as a function of the altitude measured by the altimeter. The control means of the filter respond to altitude measurements in digital format.

7 Claims, 5 Drawing Figures

TRACKING FILTER FOR RADIO ALTIMETER

The present invention relates in general to radio altimeters of the FM/CW type and more particularly to a tracking filter for use therein having a frequency response which is digitally controlled in accordance with the altimeter altitude measured by the altimeter.

Radio altimeters of the FM/CW type employ a continuous wave transmitter which is linearly frequency modulated, a receiver which includes a mixer for combining a portion of the transmitted signal with the signal received from ground reflections of the transmitted signal and a frequency counter for determining the frequency of the mixer output signal. The time delay between transmission of a signal at a particular phase and reception of the signal at that same phase is dependent upon the altitude of the aircraft in which the altimeter is installed. Because the frequency of the transmitted signal varies linearly with time, the instantaneous frequencies of the transmitted and received signals applied to the mixer will differ by an amount proportional to the altitude delay, hence the frequency of the mixer output signal is directly proportional to aircraft altitude.

In prior FM/CW radio altimeters, as disclosed, for example, in U.S. Pat. No. 3,341,849 for "Self-Calibrating, Self-Testing Radio Altimeter" by B. L. Cordry et al., performance has been improved by processing the mixer output signal with a variable frequency response filter, the response characteristic of which is varied as a function of signal strength. It will be understood that in altimeters of this type, the frequency of the processed signal is highest at the upper altitude limit of the altimeter where the signal strength is lowest and that the processed signal frequency decreases as altitude decreases while signal strength increases. Therefore, by causing the frequency response of the filter to vary as an inverse function of signal strength, the filter serves as an automatic gain control with the added advantage of narrowing the frequency spectrum of the processed signal as the aircraft nears the ground, improving the accuracy of the altimeter as the need for accuracy increases.

In a system using digital signal processing it is at least as important to control the frequency spectrum of the signals being processed as it is to control signal strength. Where the filter frequency response is controlled as a function of signal strength there is no assurance that optimum adjustment of the response will be achieved because a reduction in signal strength only implies a need to increase the filter frequency response. The strength of the received signal may vary as a result of changes in factors other than altitude, such as a change in strength of the transmitted signal and a change in the ground reflection coefficient. It is preferable, therefore, to control the filter frequency response as a function of the frequency of the processed signal rather than as a function of signal strength.

It is an object of the present invention to provide bandwidth control for a radio altimeter of the FM/CW type.

It is another object of the invention to provide bandwidth control for an FM/CW radio altimeter in the form of a tracking filter, the response characteristic of which is controlled by the frequency of the processed signal.

A further object of the invention is to provide a tracking filter for an FM/CW radio altimeter having a frequency response controlled by signal frequency so as to reduce the response of the filter to signals having frequencies higher than the frequency of the signal being processed. Other objects and advantages of the invention will become apparent as a more complete understanding thereof is gained through study of the following detailed description and the accompanying drawings.

Briefly, the invention comprises a tracking filter for controlling the bandwidth of beat frequency signals to be processed in an FM/CW radio altimeter wherein the filter response characteristic is adjusted as a function of altitude. The adjustment is made by an altitude controlled switch which varies component values in cascaded active filter sections of the RC type. Below an altitude of about 128 feet, the time constant of a high-pass filter section is increased, enhancing response at low altitude. At higher altitudes, the time constant of the high-pass section is reduced while the time constants of a dual low-pass filter section are reduced inversely with altitude, so that the high frequency roll-off characteristic of the filter is moved higher as the need arises to process higher frequency signals.

Figure 1:
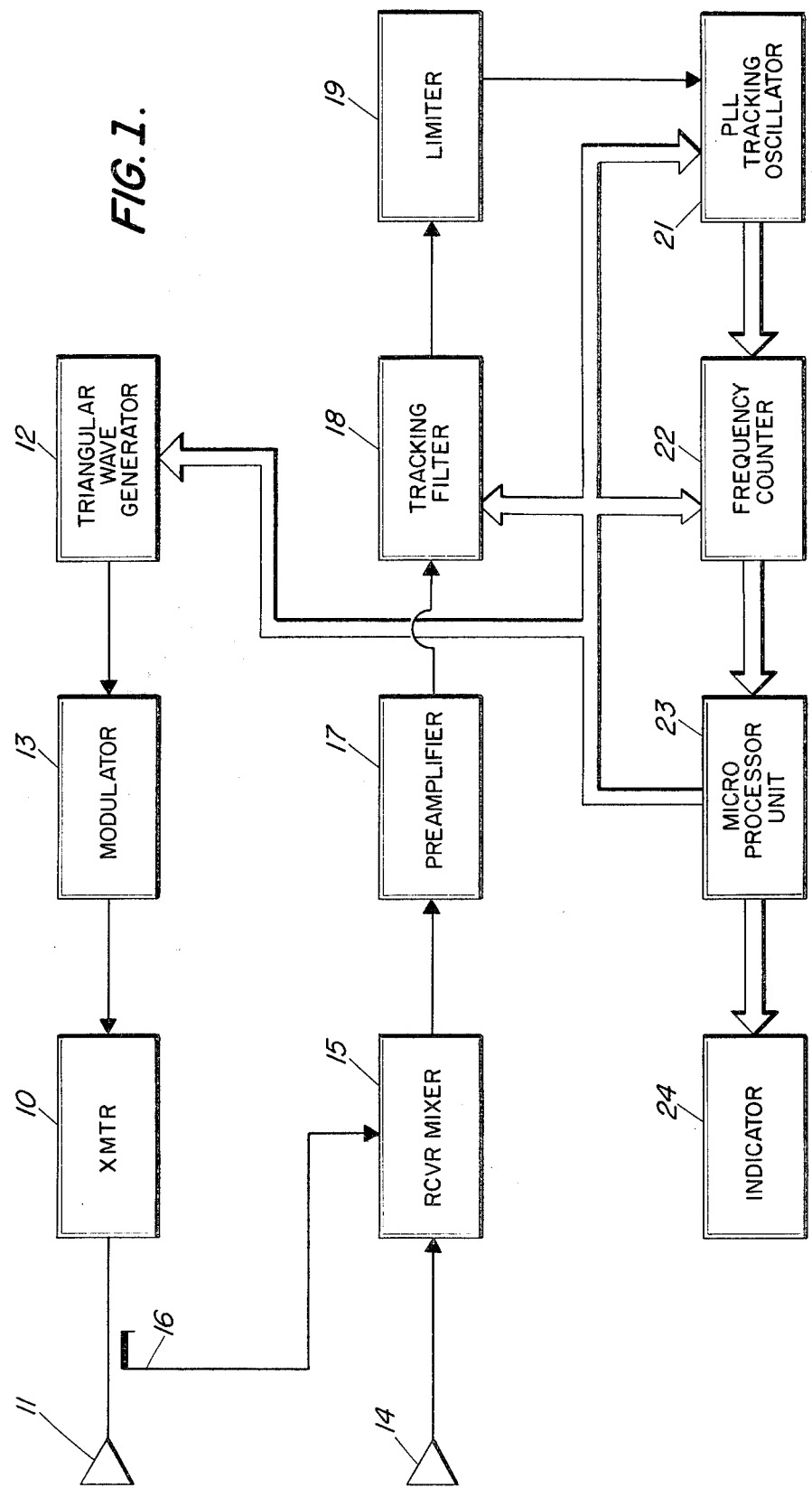
FIG. 1 is a simplified functional block diagram of an FM/CW radio altimeter incorporating the tracking filter of the invention.

An FM/CW radio altimeter incorporating the tracking filter of the present invention is shown broadly in the block diagram of FIG. 1. A transmitter 10 supplies energy to an antenna 11 located in an aircraft to project a radio beam towards the earth. The transmitter 10 supplies a continuous wave signal which is linearly frequency modulated by the output of a triangular wave generator 12 applied to a modulator 13. Ground reflections of the transmitted beam are received by an antenna 14 and applied as one input to a mixer 15. A portion of the transmitted signal derived from coupler 16 is applied as a second input to mixer 15 and the output thereof, comprising a beat signal having a frequency equal to the difference between the instantaneous frequencies of the transmitted and received signals is amplified in a broad-banded preamplifier 17.

The beat signal amplified in preamplifier 17 rather than being single valued, is actually constituted by a single sided spectrum of frequencies, the peak component of which has a frequency directly proportional to the altitude of the aircraft in which the apparatus is mounted. To assist in selecting the proper signal component for processing, preamplifier 17 is followed by a tracking filter 18 which is generally of the bandpass type intended to eliminate or reduce signal components having frequencies corresponding to altitudes above the useful range of the instrument. Signals passed by filter 18 are amplitude limited in a limiter 19, then supplied as input to a phase locked loop tracking oscillator 21. Tracking oscillator 21 is adapted to select the most prominent component from amongst the spectrum present at its input and to lock-on and follow that component, producing a signal having a single value at its output.

The frequency of the output signal from tracking oscillator 21 is determined in a frequency counter 22, data from which is arithmetically processed in a microprocessor unit 23 to produce an altitude indication in digital format. The altitude information at the output of microprocessor unit 23 may be displayed visually by an indicator 24 or preserved in digital format for utilization elsewhere in the aircraft.

Figure 2:
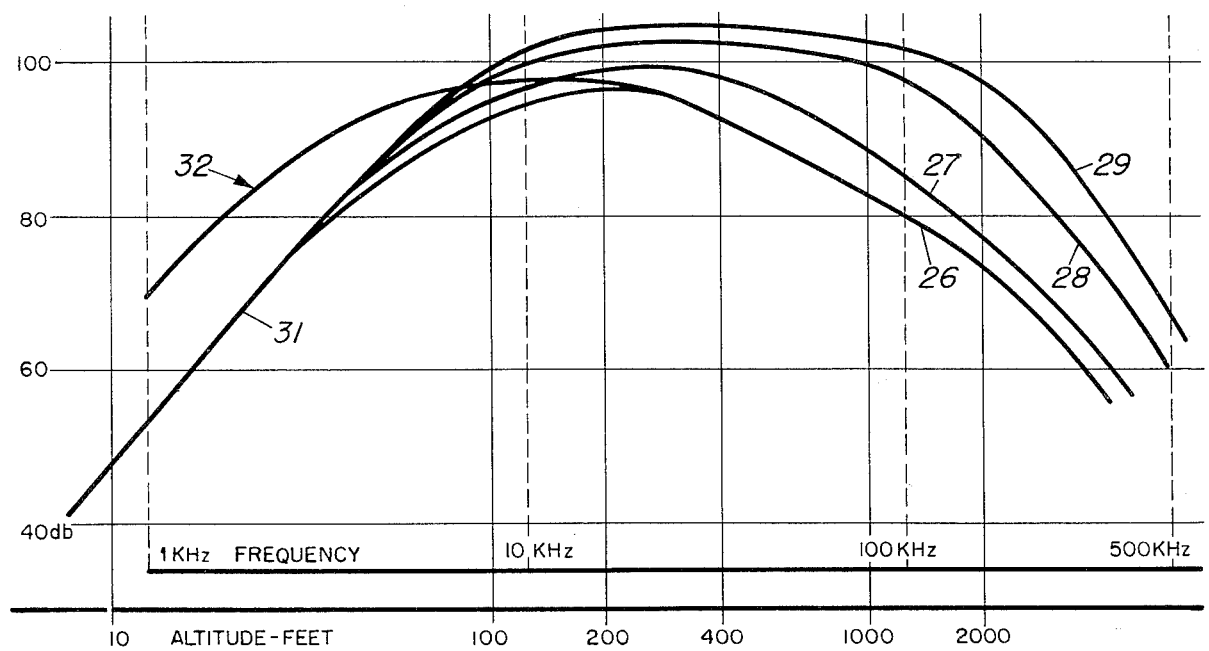
FIG. 2 is a chart of the frequency response of the tracking filter showing the characteristic at low, high and several intermediate altitudes.

The frequency response characteristic of tracking filter 18 is shown in FIG. 2. As will be understood, the slope of the triangular modulation wave from generator 12 and the transmitter modulation index determines the constant of proportionality between the beat signal frequency and altitude. This constant is 80 Hz/ft. for a specific embodiment of the invention to be described. The beat signal frequency and the corresponding altitude are plotted along the abscissa of FIG. 2. The combined response for preamplifier 17, tracking filter 18 and limiter 19 is plotted in dB along the ordinate of FIG. 2. Only several of a family of curves are shown. The characteristic of tracking filter 18, controlled as a function of altitude by microprocessor 23, determines which curve of the family is effective at any particular altitude. For altitudes below about 128 ft. the response of tracking filter 18 is described by curve 26. For altitudes above about 2000 ft., the filter characteristic is described by curve 29. For altitudes between about 128 ft. and 2000 ft., the filter characteristic is variable in 30 steps with only two of the intermediate steps 27, 28 being shown. When the altimeter is operating above about 128 ft. the low frequency response of the filter follows segment 31 of the curves with the response decreasing with decreasing frequency at the rate of 12 dB/octave. The mid-frequency response of the filter, for altitudes between about 128 ft. and 2000 ft. is selected from one of the 30 available response characteristics so that the peak response of the filter occurs at a frequency somewhat below the frequency corresponding to the actual altitude. For example, at 1000 ft. altitude, curve 27 is selected which shows a peak response at about 40 KHz, whereas the beat frequency being processed is 80 KHz. Operation in this manner enhances signal tracking for decreasing altitudes which are of vital interest during an approach to landing by the aircraft. Curve 26 is selected for operation below about 128 ft. This curve shows, in segment 32, a low frequency response which decreases with decreasing frequency at the rate of 6 dB/octave to provide compensation for the increased fluctuations in the amplitude of the ground return signal which occur at low altitude.

Figure 3:
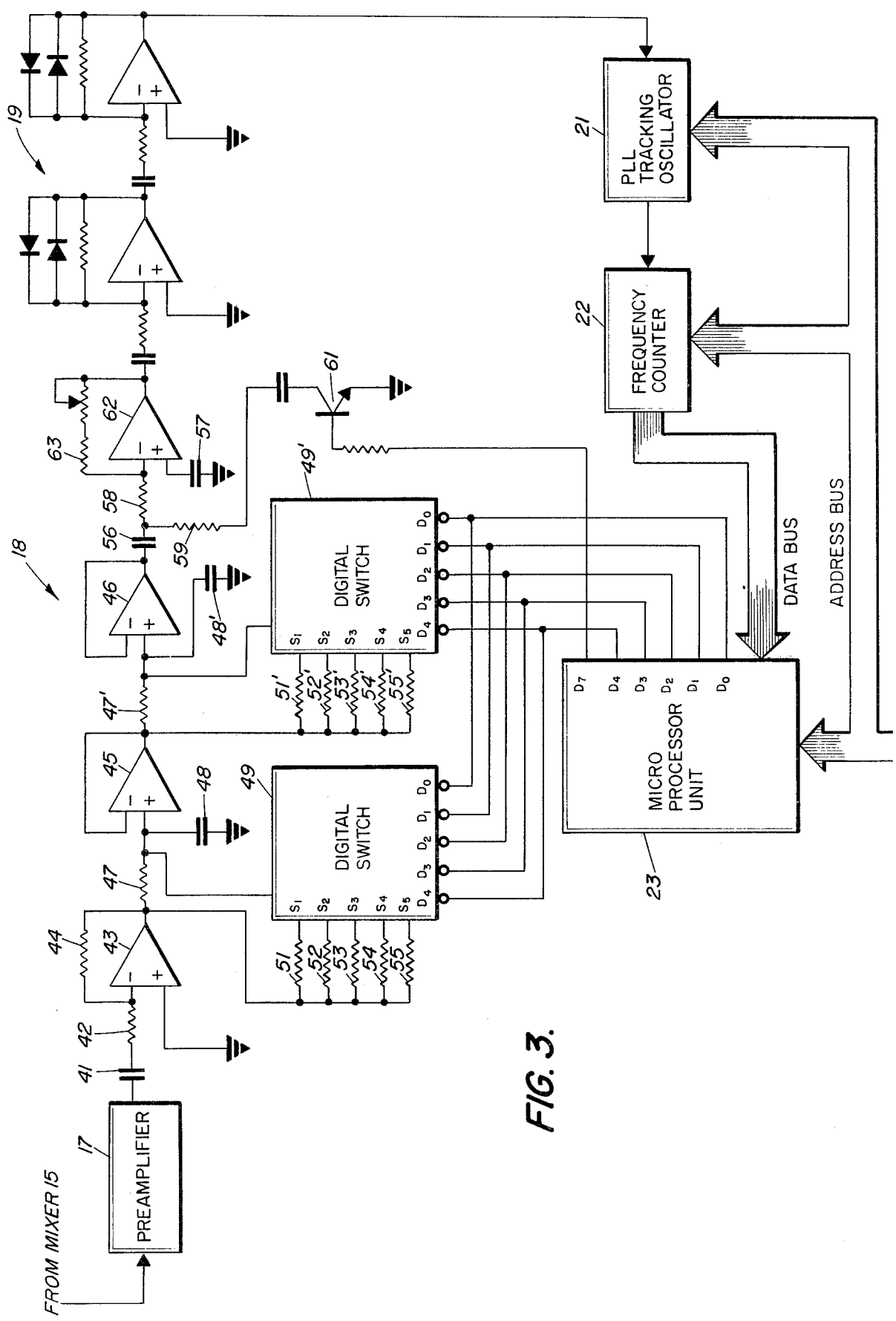
FIG. 3 is a simplified schematic diagram of the tracking filter.

The construction of tracking filter 18 is shown in the simplified schematic diagram of FIG. 3. Signal from mixer 15, after amplification in the wideband preamplifier 17, is coupled through a capacitor 41 and resistor 42 to the inverting input of an operational amplifier 43. Feedback from the output to the inverting input of amplifier 43 is provided by resistor 44. Capacitor 41 and resistor 42 form a differentiating network which contributes to the rising slope of the filter response seen in segment 31 of FIG. 2. Output from amplifier 43 is applied to a low-pass stage which includes operational amplifier 45 which is followed by an identical low-pass stage which includes operational amplifier 46. The output of amplifier 43 is connected through resistor 47 to the non-inverting input of amplifier 45. A capacitor 48 is connected between the non-inverting input and ground. A digital switch 49 is arranged to connect resistors 51-55 in parallel with resistor 47 in response to logic signals appearing on the data input lines $D_0-D_4$ thereto. The value of resistor 51 is selected to be equal to that of resistor 47, while the values of resistors 52-54 are respectively selected to be approximately $\frac{1}{2}$, $\frac{1}{4}$ and $\frac{1}{8}$ of the value of resistor 47. Resistor 55 is made substantially smaller than resistor 47. By enabling data lines $D_0-D_4$ in binary sequence, any of 32 possible values can be selected as the effective value of input resistance to amplifier 45. The highest effective input resistance is the value of resistor 47 and the lowest value is the value of resistor 47 connected in parallel with resistors 51-55. Since digital switch 49 employs negative logic all switches $S_1-S_5$ are closed upon the appearance of the sequence 0 0000 on data lines $D_0-D_4$.

The frequency response of the low-pass section is determined by the product of the values of the effective input resistance to amplifier 45 and capacitor 48. The highest value of such resistance reduces the high frequency response of the filter to its lowest value, curve 26 of FIG. 2, while the lowest value of such resistance increases the high frequency response of the filter to its highest value, curve 29, FIG. 2. Intermediate values of the effective input resistance produce curves such as 27, 28 of FIG. 2.

The low-pass section which includes amplifier 46 is identical to the low-pass section just described and is controlled by the same data inputs as are applied to digital switch 49. The frequency response of amplifier 46 is, therefore, the same as that of amplifier 45 and the combined effect of amplifiers 45 and 46 is to produce a high frequency roll-off at the rate of 12 dB/octave.

Output from amplifier 46 is differentiated in a switchable network comprising capacitors 56, 57, resistors 58, 59 and transistor 61. Capacitor 57 is of a comparatively high value so as to present negligible impedance to signal frequencies. With transistor 61 non-conductive, resistor 59 has no effect so that the time constant of the input network to operational amplifier 62 is determined by the product of the values of capacitor 56 and resistor 58. Resistor 58 is of a relatively high value compared to the value of resistor 59. When transistor 61 is rendered conductive the time constant of the input network to amplifier 62 becomes, substantially, the product of the values of capacitor 56 and resistor 59. The feedback resistor 63 is made adjustable to permit adjustment of the overall gain of filter 18 to allow compensation for tolerances in the filter component values.

Transistor 61 becomes conductive upon the appearance of a logical "1" upon data line $D_7$ from microprocessor 23. Transistor 61 is held conductive for all altitudes above about 128 ft., thereby causing the time constant of the input network to amplifier 62 to be equal to the product of the values of capacitor 56 and resistor 59. Below about 128 ft., transistor 61 becomes non-conductive causing the time constant of the input network to amplifier 62 to be equal to the product of the values of capacitor 56 and resistor 58, which is substantially higher than the value of the time constant with transistor 61 conducting. The increase in time constant occurring at low altitude increases the low frequency response of the filter, by changing the low frequency attenuation from about 12 dB/octave to 6 dB/octave, producing segment 32 of the response curve of FIG. 2.

Output from amplifier 62 is passed through a double stage limiter 19 of conventional design to the input of phase locked loop tracking oscillator 21. As was previously described, tracking oscillator 21 locks onto the most prominent component from the limited spectrum of signals present at its input and generates a single frequency signal for processing in frequency counter 22. Microprocessor unit 23 performs arithmetic operations on the data input from frequency counter 22 to solve the equation $H = 1/k\ F_d$, where H is the altitude of the aircraft, k equals 80 Hz/ft. and $F_d$ is the frequency of the output signal of tracking oscillator 21. The value of H is stored in a register in the microprocessor unit and is utilized in a subroutine, later to be described, to determine the numerical data furnished to data lines $D_0$–$D_4$ and $D_7$ for controlling the characteristics of the tracking filter 18.

Figure 4:
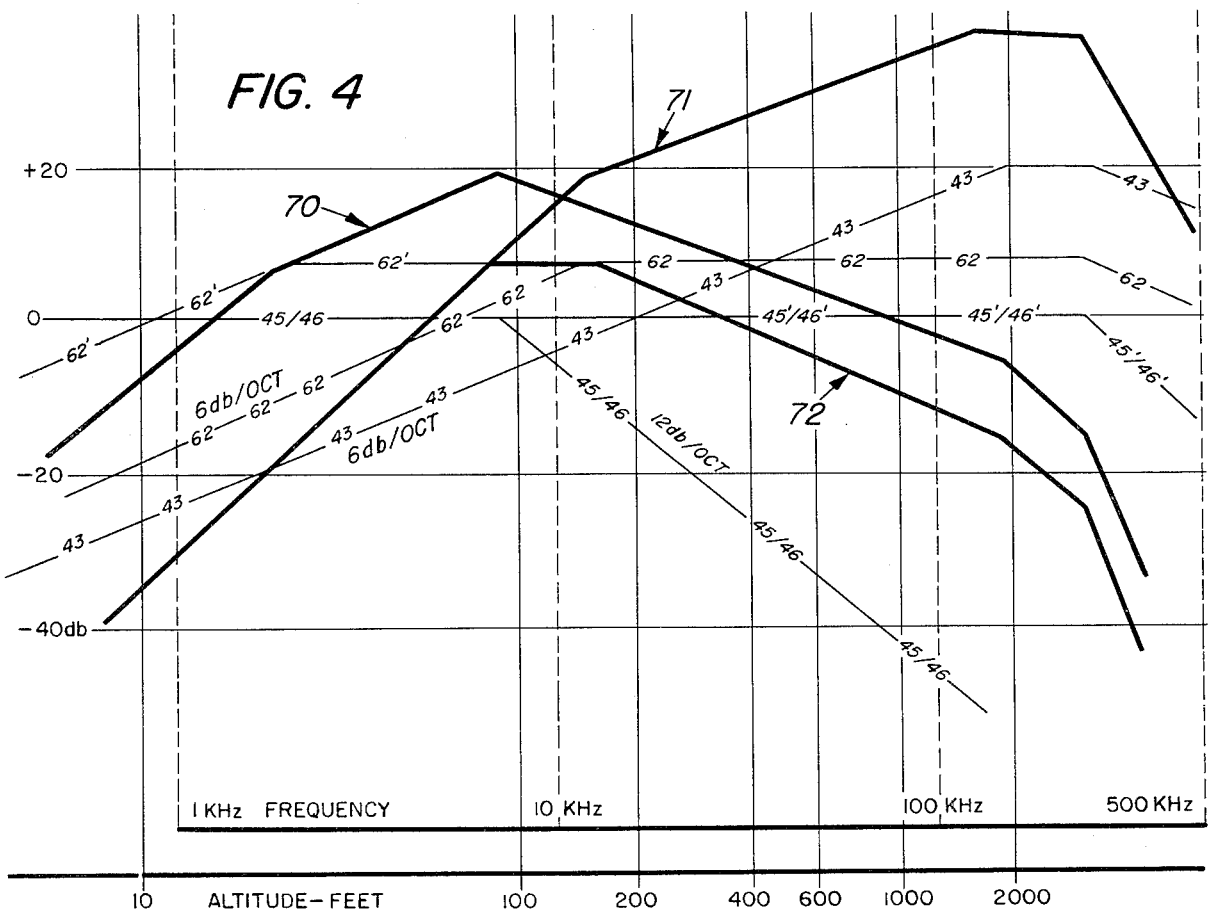
FIG. 4 is a Bode chart of the tracking filter frequency response.

The effect of the operation of digital switches 49, 49' and transistor 61 on the frequency response of the tracking filter can best be understood by reference to the Bode chart of FIG. 4. The Bode chart is a plot of the asymptotic frequency responses of the individual stages of the tracking filter. The overall asymptotic frequency response of the filter is obtained by summing the responses of the individual stages.

Amplifier 43 has the following voltage transfer function:

$$\frac{E_o}{E_1} = A \cdot \frac{T_1 S}{T_2 S + 1} = A \cdot \frac{jR_{44}C_{41}\omega}{jR_{42}C_{41}\omega + 1} \quad (1)$$

$$A = \frac{R_{44}}{R_{42}},\ S = d/dt$$

The time constant, $T_2 = R_{42} \cdot C_{41}$, is chosen to provide a corner frequency, $f_c = 1/2\pi T$ of approximately 169 KHz. Resistors $R_{44}$ and $R_{42}$ are selected to provide a gain A of 20 dB. The response of amplifier 43 can therefore be represented asymptotically by line 43 of FIG. 4 which shows a slope rising linearly from lower frequencies at the rate of 6 dB/octave to the corner frequency of 169 KHz at a level of 20 dB, thereafter extending horizontally to about 250 KHz where high frequency roll-off commences due to inherent frequency limitations in amplifier 43.

The voltage transfer function, from the output of amplifier 43 to the output of amplifier 46 is given by:

$$\frac{E_o}{E_1} = A \frac{1}{(T_3 S + 1)^2} = A \frac{1}{(jR_{eff}C_{48}\omega + 1)^2} \quad (2)$$

$$A = 1$$

The time constant, $T_3 = R_{eff} \cdot C_{48}$, of equation (2) depends upon the effective value of the input resistance to amplifier 45 or 46. At its highest value all switches $S_1$–$S_5$ are open and the effective input resistance is the value of $R_{47}$. The values of $R_{47}$ and $C_{48}$ are selected to provide a corner frequency of approximately 7.2 KHz.

The lowest effective input resistance to amplifiers 45 and 46 is provided when all switches $S_1$–$S_5$ are closed. The values of resistors 51–55 are selected to provide a corner frequency, with all switches closed, of 250 KHz.

The asymptotic frequency response of amplifiers 45/46 is shown by the horizontal line extending along the 0 dB ordinate to the corner frequency of 7.2 KHz and thereafter along the line having a decreasing slope of 12 dB/octave. The asymptotic response for the lowest effective input resistance to amplifiers 45/46 is shown by the horizontal line 45'/46' extending along the 0 dB ordinate to the corner frequency of 250 KHz and thereafter along a decreasing slope of 12 dB/octave.

The frequency response for amplifiers 45/46 for values of effective input resistance intermediate between highest and the lowest values have not been shown but it will be understood that such responses are similar to those illustrated except that the corner frequencies have values intermediate between 7.2 and 250 KHz, depending upon the combination of switches $S_1$–$S_5$ which are closed.

The voltage transfer function from the output of amplifier 46 to the output of amplifier 62, with transistor 61 conducting, is given approximately by:

$$\frac{E_o}{E_1} = A \frac{T_4 S}{T_4 S + 1} = A \frac{jR_{59}C_{56}\omega}{jR_{59}C_{56}\omega + 1} \quad (3)$$

$$A = \frac{R_{63}}{R_{58}}$$

The values of resistors 63 and 58 are selected to provide a gain A of about 7 dB. The values of resistor 59 and capacitor 56 are selected to provide a corner frequency of approximately 12.3 KHz. The asymptotic frequency response of amplifier 62 is therefore shown by the line 62 having a rising slope of 6 dB/octave to intercept the 7 dB ordinate at 12.3 KHz. Thereafter the response is flat to about 250 KHz where roll-off begins because of inherent frequency limitations of the amplifier.

The voltage transfer function from the output of amplifier 46 to the output of amplifier 62, with transistor 61 non-conductive, is given approximately by:

$$\frac{E_o}{E_1} = A \frac{T_5 S}{T_6 S + 1} = A \frac{jR_{63}C_{56}\omega}{jR_{58}C_{56}\omega + 1} \quad (4)$$

$$A = \frac{R_{63}}{R_{58}}$$

Resistor 58 is of substantially higher value than resistor 59 so the effect of switching transistor 61 off is to substantially lower the corner frequency of the response of amplifier 62. The time constant, $T_6 = R_{58} \cdot C_{56}$, selected for the input network to amplifier 62, with transistor 61 non-conductive, produces a corner frequency of approximately 1.85 KHz. The asymptotic frequency response for amplifier 62, with transistor 61 non-conductive, is shown by the line 62' which, except for the lower corner frequency, is similar to line 62.

The overall asymptotic frequency response of tracking filter 18 can now be shown for various operating conditions as the sum of the values of lines 43, 45/46 and 62 as those lines are varied in response to changes in altitude. The response of the tracking filter below an altitude of about 128 ft. follows the asymptote shown in curve 70. Transistor 61 is then non-conductive and all switches $S_1$–$S_5$ are open. Lines 62', 43 and 45/46 therefore determine the shape of curve 70. Below 1.85 KHz curve 70 slopes at 12 dB per octave. Between 1.85 and 7.2 KHz curve 70 shows a 6 dB/octave rising slope. From 7.2 to 169 KHz curve 70 falls off at the rate of 6 dB/octave and thereafter the curve decreases at the rate first of 12 dB/octave and then at 24+dB per octave.

At high altitude, say 2500 ft., transistor 61 is conductive and all switches $S_1$–$S_5$ are closed. Therefore the filter response follows asymptotically curve 71 which results from combining lines 43, 45'/46' and 62. Below 12.3 KHz curve 71 falls off at the rate of 12 dB/octave. Between 12.3 and 135 KHz curve 71 rises at 6 dB/octave and at 250 KHz falls off at 24+dB per octave. Curve 72 shows the result with transistor 61 conducting and all switches $S_1$-$S_5$ open. It will be understood that closing switches $S_1$-$S_5$ in various combinations will result in curves intermediate in value between curves 72 and 71.

Figure 5:
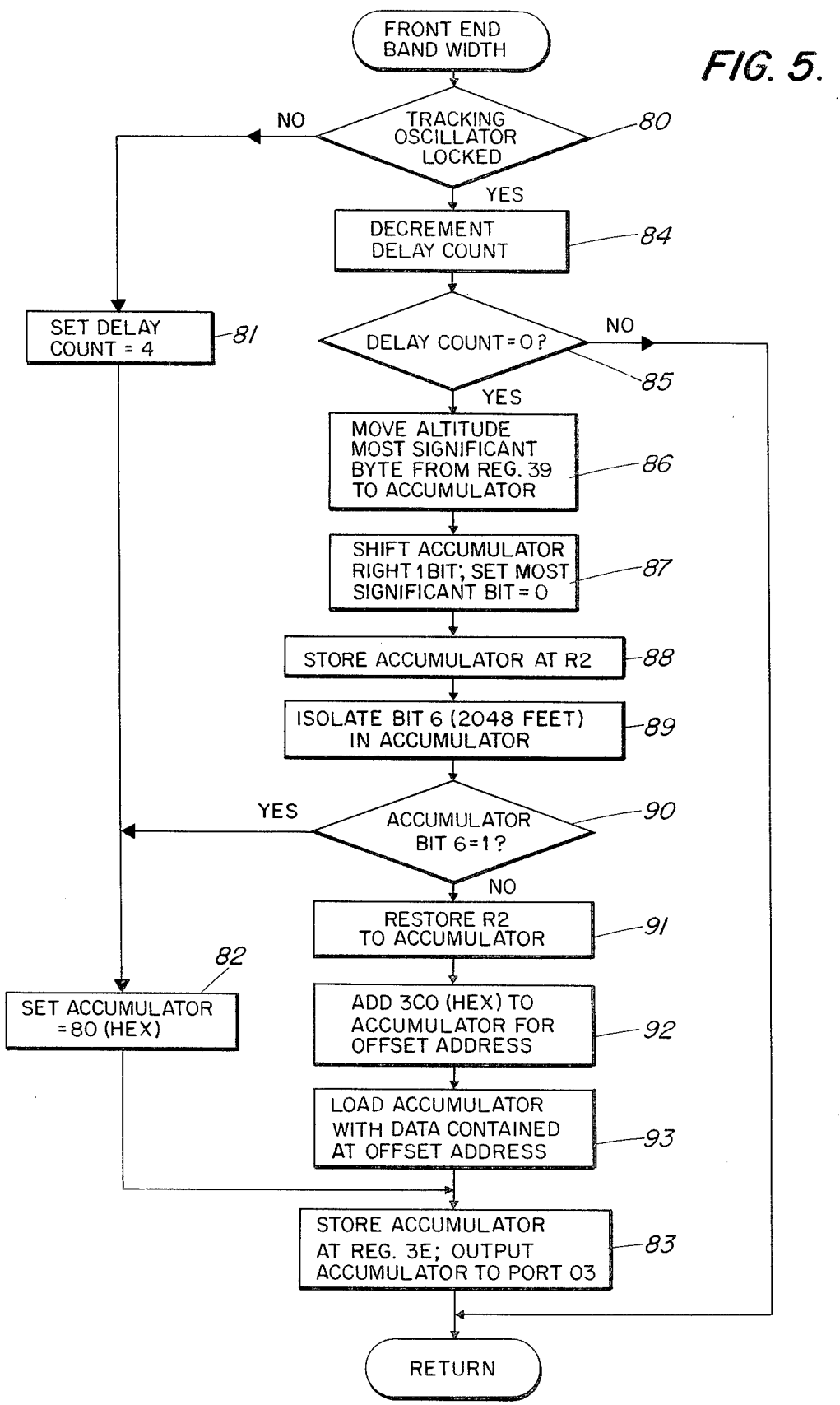
FIG. 5 is a flow chart illustrating the operation of the microprocessor unit in controlling the frequency characteristic of the tracking filter.

The microprocessor unit 23 controls the frequency response of filter 18 as a function of altitude by performing the subroutine "Front End Bandwidth" shown in the flow chart of FIG. 5. Each program cycle, which includes four modulation cycles of triangle wave generator 12, an interrupt occurs which switches operation of the microprocessor to the FEBW subroutine. First, in decision block 80, a PLL locked flag from tracking oscillator 21 is tested. If the flag is not set, indicating that an altitude signal has not been acquired, the program branches to block 81 where a delay counter is set to 4, following which, in block 82, an accumulator is set to 80(Hex) and the program proceeds to block 83 where the accumulator contents are stored at register 3E and are strobed out to write port 03 of the microprocessor. Port 03 includes data lines $D_0$-$D_4$ and $D_7$. 80(Hex) has the binary format 1000 0000 resulting in data lines $D_0$-$D_4$ being set to 0 and data line $D_7$ being set to 1. Since digital switches 49 and 49' employ negative logic, switches $S_1$-$S_5$ will then all be closed and transistor 61 will be conductive ($D_7$=1). The result is that until signal is acquired the frequency response of filter 18 is opened wide, following curve 29 of FIG. 2. After supplying the accumulator data to port 3 the program returns to decision block 80 to await the interrupt of the next program cycle.

On succeeding program cycles when signal has been acquired and the PLL locked flag has been set, after interrupt the program proceeds from block 80 to block 84 to decrement the delay counter by one count. In decision block 85 the contents of the delay counter are tested for equality to 0. If the delay counter contents are not 0 the program returns to the start to await the next interrupt. The delay of 4 program cycles before executing the subroutine to adjust the filter frequency response insures that valid altitude data will be contained by the microprocessor before any adjustment is made in the frequency of filter 18.

After the program proceeds through block 84 and the delay count has been decremented to 0, the program continues to block 86. The computed altitude is contained in the microprocessor in two bytes of 8 bits each, the most significant byte being stored in register 39 and the least significant byte being stored in register 38. The least significant bit of register 38 has an altitude value of ½ ft. and the most significant bit of register 39 has an altitude value of 4096 ft. In block 86 the higher order byte of the altitude register, i.e. contents of register 39, are loaded into the accumulator. The least significant bit of the 8 bit byte then has an altitude value of 32 ft. and the most significant bit has an altitude value of 4096 ft. Since the altimeter has an upper altitude limit of 2500 ft. only bit 0 through bit 6 of the higher order byte are significant. Also, it is desired to vary the filter frequency response in steps corresponding to altitude increments of 64 ft. In block 87, the contents from register 39 loaded into the accumulator are shifted right 1 bit and the most significant bit (bit 7) of the accumulator is set to 0. After this operation, bit 0 has an altitude value of 64 ft. and bit 6 has an altitude value of 2048 ft. At blocks 88 and 89 the modified contents of the accumulator are stored at register R2 and bit 6 of the accumulator is isolated for test.

In decision block 90, accumulator bit 6 is tested for equality to 1. If the equality is true, indicating that the aircraft is at or above 2048 ft., the program branches to block 82 where the accumulator is set to 80(Hex) and the program exits through block 83, furnishing data to port 03 to cause the filter frequency response to open wide. If, at block 90, bit 6 does not equal 1, the altitude contents of register R2 are restored to the accumulator at block 91. Then, to obtain the address of proper data for operating digital switches 49, 49' which is stored at memory locations 3CO(Hex) through 3DF(Hex), an offset of 3CO is added to the altitude contents of the accumulator at block 92.

Table I below is an abbreviated listing of the contents of memory locations 3CO through 3DF:

TABLE I

| Altitude Ft. | (Hex) | Address (Hex) | Memory (Hex) | Contents $D_7$... | ...$D_0$ |
|---|---|---|---|---|---|
| 0-63 | 00 | 3C0 | 3F | 0011 | 1111 |
| 64-127 | 01 | 3C1 | 1F | 0001 | 1111 |
| 128-191 | 02 | 3C2 | 9F | 1001 | 1111 |
| 192-255 | 03 | 3C3 | 9E | 1001 | 1110 |
| 256-319 | 04 | 3C4 | 9D | 1001 | 1101 |
| . | . | . | . | . | . |
| 1920-1983 | 1E | 3DE | 83 | 1000 | 0011 |
| 1984-2047 | 1F | 3DF | 82 | 1000 | 0010 |
| 2048 + | 20 | Accumulator Set = | 80 | 1000 | 0000 |

At block 93, the contents of the specified memory location are fetched and loaded into the accumulator and the program exits through block 83 supplying appropriate data through port 03 to adjust the filter frequency response. Referring to Table I, at 00(Hex) altitude the data output to the filter is 3F(Hex). The binary equivalent of 3F(Hex) shows the data output on lines $D_0$-$D_4$, each to be 1 and $D_7$ to be 0. Switches $S_1$-$S_5$ of FIG. 3 are then all open and transistor 61 is non-conductive. Thus, the filter response follows curve 32 of FIG. 2. At 01(Hex) altitude the data output is 1F(Hex) but the filter response does not change since data bit $D_5$ is not decoded for filter operation ($D_5$ is used elsewhere in the system). At altitudes from 02 to 1F(Hex) $D_7$ is 1 and $D_0$-$D_4$ decrease incrementally as altitude increases causing the filter response to follow curves intermediate of curves 26 and 29, FIG. 2.

Obviously many modifications and variations in the embodiment of the invention specifically disclosed may be made without departing from the spirit and scope of the following claims:

The invention claimed is:

1. In an FM/CW radio altimeter, a variable frequency response filter for restricting the frequency band of beat frequency signals processed by the altimeter to measure altitude, said altimeter including means containing in digital format the altitude measured by the altimeter, comprising a filter section having an attenuation versus frequency characteristic in which attenuation increases with increasing frequency, said characteristic being defined asymptotically by a pair of straight line asymptotes intersecting at a corner frequency;

a switchable network in said filter section, said network including a plurality of discrete circuit components connectable therein to vary the corner frequency at which said asymptotes of said attenuation versus frequency characteristic intersect; and digital means controlled by said altimeter means containing measured altitude, for connecting selected ones of said circuit components in said network to cause said corner frequency to decrease as said measured altitude decreases.

2. A filter as claimed in claim 1, with additionally, a second filter section connected in cascade with said filter section, said second filter section having an attenuation versus frequency characteristic in which attenuation decreases with increasing frequency, said second filter section characteristic being defined asymptotically by a second pair of straight line asymptotes intersecting at a second corner frequency lower than said corner frequency.

3. A filter as claimed in claim 2, with additionally, switchable means for decreasing said second corner frequency and means controlled by said altimeter means containing measured altitude, for engaging said last named means at low altitude.

4. In an FM/CW radio altimeter, a variable frequency response filter for restricting the frequency band of beat frequency signals processed by the altimeter to measure altitude, said altimeter including means containing in digital format the altitude measured by the altimeter, comprising, a plurality of operational amplifiers connected in cascade for amplifying said beat frequency signals, a gain controlling network in each said amplifier, each said network having an attenuation versus frequency characteristic in which attenuation varies with frequency, digital switching means for varying the attenuation versus frequency characteristic of each said network, said switching means being responsive to said altimeter means containing measured altitude to vary said characteristics so that the sum thereof provides an attenuation versus frequency characteristic in which high frequency attenuation is increased as said measured altitude decreases.

5. A filter as claimed in claim 4 wherein one of said operational amplifiers and said gain controlling network therein provides a voltage transfer function expressing the ratio of the output to the input thereof of the form:

$$1/(TS+1)$$

wherein

T is a constant and S is the differential operator $d/dt$, and said digital switching means are responsive to said measured altitude to increase the value of T in said transfer function as said measured altitude decreases.

6. A filter as claimed in claim 5 wherein a second of said operational amplifiers and said gain controlling network therein provides a voltage transfer function expressing the ratio of the output to the input for said second amplifier of the form:

$$T_1 S/(T_2 S+1)$$

wherein $T_1$ and $T_2$ are constants and S is the differential operator $d/dt$.

7. A filter as claimed in claim 6 wherein said digital switching means are responsive to said measured altitude to increase the value of $T_2$ at a low value of said measured altitude.

* * * * *